US011503053B2

(12) United States Patent
Zhang et al.

(10) Patent No.: US 11,503,053 B2
(45) Date of Patent: Nov. 15, 2022

(54) SECURITY MANAGEMENT OF AN AUTONOMOUS VEHICLE

(71) Applicant: Beijing Voyager Technology Co., Ltd., Beijing (CN)

(72) Inventors: Jiang Zhang, San Jose, CA (US); Alexander Burt, San Jose, CA (US); Xiaoyong Yi, Fremont, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 383 days.

(21) Appl. No.: 16/722,458

(22) Filed: Dec. 20, 2019

(65) Prior Publication Data

US 2021/0194904 A1  Jun. 24, 2021

(51) Int. Cl.
*H04L 9/40* (2022.01)
*G06F 16/17* (2019.01)
*G05D 1/00* (2006.01)

(52) U.S. Cl.
CPC ....... *H04L 63/1425* (2013.01); *G05D 1/0088* (2013.01); *G06F 16/1734* (2019.01); *H04L 63/101* (2013.01); *H04L 63/1416* (2013.01); *H04L 63/20* (2013.01); *G05D 2201/0213* (2013.01)

(58) Field of Classification Search
CPC ............... H04L 63/1425; H04L 63/101; H04L 63/1416; H04L 63/20; H04L 63/1441; H04L 63/1433; G06F 16/1734; G05D 1/0088; G05D 2201/0213
See application file for complete search history.

(56) References Cited

U.S. PATENT DOCUMENTS

| 10,235,252 | B1* | 3/2019 | Lieberman | .......... G06F 11/3065 |
| 10,322,724 | B2 | 6/2019 | Edren et al. | |
| 2017/0031741 | A1* | 2/2017 | Seigel | ................. G06F 11/0709 |
| 2017/0063996 | A1* | 3/2017 | Kaster | ................. H04L 63/1441 |
| 2017/0318036 | A1* | 11/2017 | Movsisyan | ......... H04L 63/1425 |
| 2018/0293891 | A1* | 10/2018 | Troutman | ............ G07C 5/0825 |
| 2019/0156593 | A1* | 5/2019 | Sasaki | ............... B60W 50/0205 |

(Continued)

FOREIGN PATENT DOCUMENTS

| CN | 104732805 A | 6/2015 |
| CN | 206870882 U | 1/2018 |

(Continued)

OTHER PUBLICATIONS

Chen et al., "A History and Theory of Textual Event Detection and Recognition," IEEE Access Year: 2020 | vol. 8 | Journal Article | Publisher: IEEE.*

(Continued)

*Primary Examiner* — Roderick Tolentino
(74) *Attorney, Agent, or Firm* — Sheppard Mullin Richter & Hampton LLP

(57) ABSTRACT

Methods, systems, and apparatus, including computer programs encoded on computer storage media, for managing security of a vehicle are provided. One of the methods includes: monitoring a plurality of activities of one or more electronic devices associated with the vehicle; generating a plurality of event logs based on the monitored activities; sending the generated event logs to a server; and receiving, from the server, one or more alerts created based on the generated event logs.

20 Claims, 7 Drawing Sheets

(56) References Cited

U.S. PATENT DOCUMENTS

2019/0349332 A1* 11/2019 Murthy .................. H04L 63/02
2020/0396231 A1* 12/2020 Krebs ...................... G06N 5/04
2021/0006571 A1*  1/2021 Yi ......................... H04L 63/102
2021/0203682 A1*  7/2021 Bajpai ..................... G06F 21/55
2021/0331712 A1* 10/2021 Lee ....................... B60W 50/14

FOREIGN PATENT DOCUMENTS

| CN | 108319254 A | 7/2018 |
| CN | 108923989 A | 11/2018 |
| CN | 109525420 A | 3/2019 |
| CN | 110086679 A | 8/2019 |
| CN | 110460669 A | 11/2019 |

OTHER PUBLICATIONS

Einspieler et al., "Integrating time-triggered and event-triggered traffic in a hard real-time system," 2018 IEEE Industrial Cyber-Physical Systems (ICPS) Year: 2018 | Conference Paper | Publisher: IEEE.*

PCT International Search Report and the Written Opinion dated Mar. 9, 2021, issued in related International Application No. PCT/CN2020/137589 (8 pages).

* cited by examiner

SECURITY MANAGEMENT OF AN AUTONOMOUS VEHICLE

TECHNICAL FIELD

The disclosure generally relates to autonomous vehicles, particularly to security management for the autonomous vehicles.

BACKGROUND

An autonomous vehicle may be capable of sensing its environment and automatically moving with little or no human input. Various operations of the autonomous vehicle may be performed by hardware or software systems fixed in or otherwise coupled to the autonomous vehicle. The hardware or software systems may include, for example, autonomous driving systems, gateways for communicating with external networks, operating systems running on the hardware systems, and software applications installed in the operating systems. The hardware and software systems may be configured to control various functionalities of the autonomous vehicle, such as autonomous driving, account management, record keeping, payment processing, or network communications.

An autonomous vehicle may not be physically attended by a human driver while operating, but may be made accessible to one or more users, passengers or third parties. The users, passengers, or third parties may have access to the hardware or software systems associated with the autonomous vehicle. Furthermore, the hardware or software systems may connect to one or more external systems via one or more network interfaces. The unattended nature of the autonomous vehicle may open up opportunities for attackers to attack the hardware or software systems. For example, an attacker may maliciously modify software running on an autonomous driving system, unlawfully access, transfer or modify private or proprietary data stored in the hardware systems, or even manipulate credentials maintained by the autonomous vehicle to take over control of the vehicle. For management of a fleet of autonomous vehicles, it is difficult to manually or individually check and ensure the security of each vehicle. Therefore, there is need for a solution that detect security threats for an autonomous vehicle and provide measures to prevent or mitigate the security threats. The solution needs to provide early detection of a security threat, to accurately identify the nature of the security threat and the asset potentially compromised by the security threat, and to substantially avoid false alarms. The solution also needs to allow intervention by remote personnel or a central controlling system without requiring presence of personnel at the location of the vehicle.

SUMMARY

One aspect of the present disclosure is directed to a computer-implemented method for managing security of a vehicle. The method may comprise monitoring a plurality of activities of one or more electronic devices associated with the vehicle and generating a plurality of event logs based on the monitored activities. The method may also comprises sending the generated event logs to a server and receiving, from the server, one or more alerts created based on the generated event logs.

In some embodiments the electronic devices may comprise one or more electronic control units (ECUs), one or more autonomous driving systems (ADSs), one or more security gateways, or one or more security agents.

In some embodiments, the generating a plurality of event logs may comprise generating the plurality of event logs based on one or more preset rules. Each of the one or more preset rules may be associated with one or more of the electronic devices.

In some embodiments, the monitored activities may comprise code modifications, account activities, access to protected data, or command or program execution.

In some embodiments, the generating the plurality of event logs may comprise determining, for each of one or more of the monitored activities, whether the activity meets one or more conditions associated with at least one of one or more preset rules.

In some embodiments, the method may further comprise, after the sending the generated event logs to a server, analyzing the generated event logs by the server. The analyzing may comprise categorizing the generated event logs and applying a detection logic to the categorized event logs and creating one or more alerts based on the analyzing by the server.

In some embodiments, the analyzing the generated event logs may comprise, for each of one or more of the generated event logs, identifying a source associated with an activity corresponding to the event log, determining that the source is not among a list of trusted sources stored by the server, and creating an alert associated with the event log based on the determination.

In some embodiments, the analyzing the generated event logs may comprise, for each of one or more of the generated event logs, identifying a source associated with an activity corresponding to the event log, determining that the source is among a list of prohibited sources stored by the server, and creating an alert associated with the event log based on the determination.

In some embodiments, the method may further comprise, after the sending the generated event logs to a server, storing the event logs into a database by the server.

In some embodiments, the one or more received alerts may comprise instructions associated with countermeasures for preventing one or more security threats.

In some embodiments, the method may further comprise, after the receiving one or more alerts created based on the generated event logs, implementing the countermeasures based on the instructions to prevent the one or more security threats.

Another aspect of the present disclosure is directed to a system for managing security of a vehicle. The system may comprise a client associated with the vehicle and a server. The client and the server may comprise one or more processors and one or more non-transitory computer-readable memories coupled to the one or more processors and configured with instructions executable by the one or more processors to cause the system to perform: monitoring, by the client, a plurality of activities of one or more electronic devices associated with the vehicle; generating, by the client, a plurality of event logs based on the monitored activities; sending, by the client to the server, the generated event logs; and receiving, by the client from the server, one or more alerts created based on the generated event logs.

Another aspect of the present disclosure is directed to a non-transitory computer-readable storage medium for managing security of a vehicle, configured with instructions executable by one or more processors to cause the one or more processors to perform operations. The operations may comprise monitoring a plurality of activities of one or more electronic devices associated with the vehicle; generating a plurality of event logs based on the monitored activities; sending the generated event logs to a server; and receiving, from the server, one or more alerts created based on the generated event logs.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Figure 1:
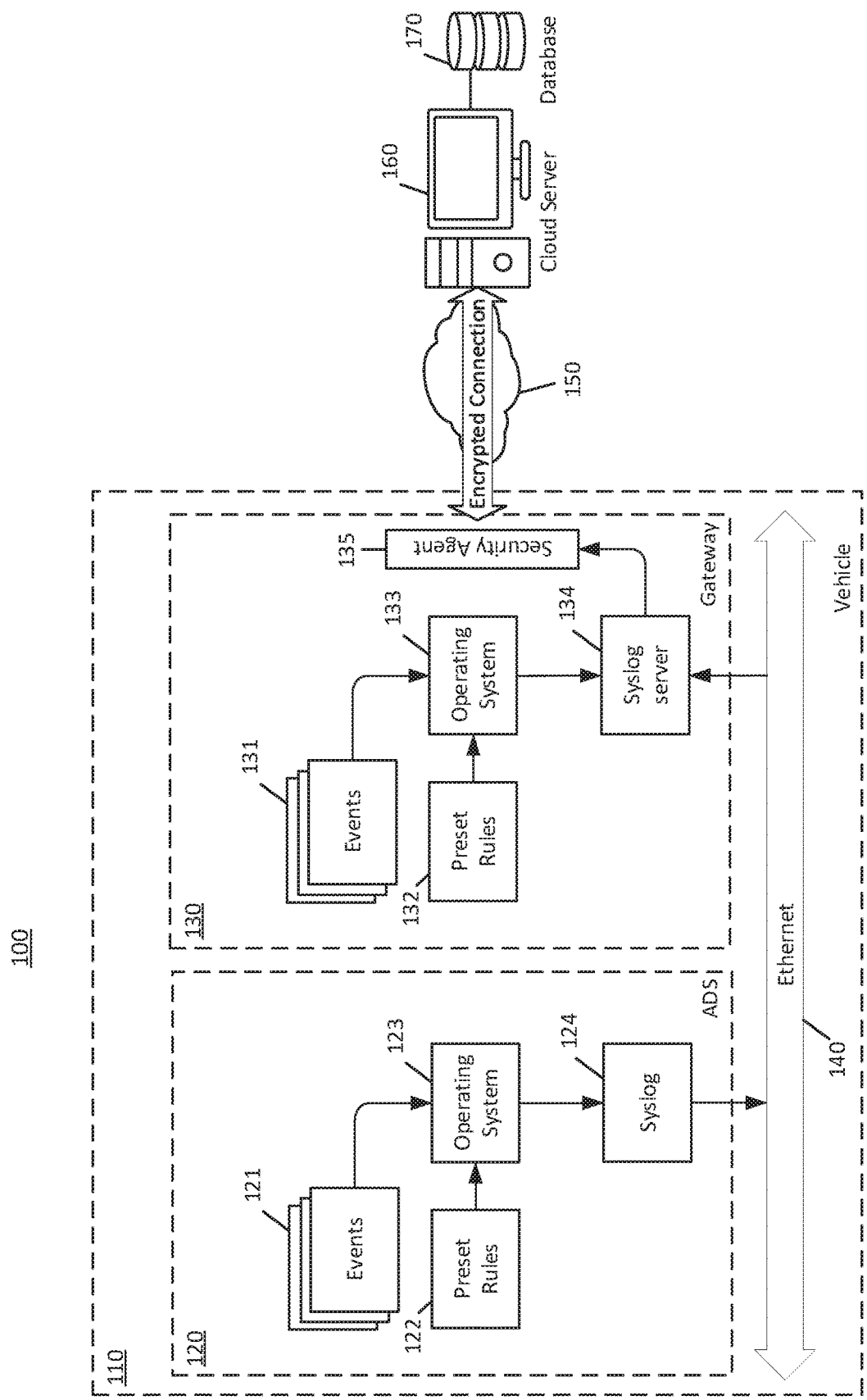
FIG. 1 illustrates an example network environment associated with security management of a vehicle.

Specific, non-limiting embodiments will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of this specification. Various changes and modifications obvious to one skilled in the art to which the specification pertains are deemed to be within the spirit, scope and contemplation of the specification as further defined in the appended claims.

Particular embodiments disclosed herein are directed to a security management system for an autonomous vehicle. The security management system may comprise an audit tool running on one or more computing devices associated with the vehicle. The audit tool may monitor activities occurring on one or more hardware or software systems in the vehicle and capture one or more events according to a plurality of preset audit rules. Each audit rule may specify one or more protected assets and one or more conditions for capturing an event based on activities occurring with respect to the protected assets. The audit tool may generate one or more event logs for each captured event. The security management system may also comprise an application for detecting security threats that may run at a cloud server. The audit tool may send the event logs to the cloud server for analysis. The application for detecting security threats may process the event logs and determine, for each of one or more of the event logs, whether to generate an alert indicating a security threat. In some embodiments, the event logs may be categorized into several categories. Security threats associated with each category of event logs may be processed by a detection logic corresponding to the category. Each specific security threat may be detected further based on specific detection rules used by the detection logic. Such a structure of the application for detecting security threats is configured to accommodate new security threats with only modifications to the detection rules and minimum or no modifications to the detection logic. The server may send to the vehicle information associated with the alert and instructions associated with measures to prevent the security threat for implementation.

Embodiments disclosed herein provide various technical benefits and improvements. Some embodiments provide a security management system configured to detect security threats to an autonomous vehicle in a timely manner. Various analysis tools associated with the security management systems may accurately identify events to capture and analyzes the events to determine the nature of any related security threats. The security management system balances the need for quickness and the complexity of security management by distributing computational tasks between a client-side system associated with the vehicle and a server-side system that may be centrally controlled. In this manner, the security management system may relieve the necessity of human attendance at the autonomous vehicle for security management. Furthermore, the security management system separates detection logics for categories of security threats and specific rules for individual security threats, thus minimizes the effort required for updating the system to address new or unaddressed security threats.

FIG. 1 illustrates an example network environment associated with security management of a vehicle. The network environment 100 may comprise a vehicle 110, a cloud server 160, and a database 170. The vehicle 110 may be an autonomous vehicle. The vehicle 110 may include an autonomous driving system (ADS) 120, a gateway 130, and an ethernet interface 140. The vehicle 110 may communicate to the cloud server 160 through a secured connection, such as an encrypted connection 150. The database 170 may be associated with or accessible to the cloud server 160. The ADS 120 may be connected to the gateway 130 via the ethernet interface 140. In some embodiments, the vehicle 110 may comprise one or more electronic control units (ECUs) in addition to the ADS 120. Each of one or more of the ECUs may have a configuration similar to the ADS 120 and may be connected to the gateway 130 via the ethernet interface 140. The gateway 130 may provide one or more channels for one or more components of the vehicle 110 to communicate with an external network. The gateway 130 may comprise a security agent 135 configured to establish secured communication channels with external systems.

In some embodiments, the ADS 120 may comprise an operating system 123 (e.g., a Linus operating system). The operating system 123 may comprise one or more system auditing components (e.g., Linus Auditd). In some embodiments, the operating system 123, using one or more of its system auditing components, may access a plurality of events 121 occurring on the ADS 120. The events 121 may correspond to a plurality of activities including, for example, file modification, command or file execution, file transfer, other suitable activities, or any combination thereof. The operating system 123 may have access to a plurality of preset rules 122 for system auditing (e.g., Auditd rules). The preset audit rules 122 may have been created based on potential security threats and assets to protect associated with the ADS 120 and loaded to one or more storage devices associated with the vehicle 100. In some embodiments, the operating system 123 of the ADS 120 may capture one or more of the events 121 based on the preset rules 122 and generate one or more event logs accordingly. The operating system 123 may capture the one or more of the events 121 by determining whether the activity, for each of the one or more events (e.g., a monitored activity), meets one or more conditions associated with at least one of the one or more preset rules 122. The operating system 123 may send the plurality of generated event logs to the syslog 124. The syslog 124 may send the generated event logs to the syslog server 134 through the ethernet interface 140. The syslog server 134 may send the generated event logs received from the syslog 124 to the security agent 135. The security agent 135 may send the generated event logs to the cloud server 160 through the encrypted connection 150.

In some embodiments, the gateway 130 may comprise an operating system 133 (e.g., a Linus operating system). The operating system 133 may comprise one or more system auditing components (e.g., Linus Auditd). In some embodiments, the operating system 133, using one or more of its system auditing components, may access a plurality of events 131 occurring on the gateway 130. The operating system 123 may have access to a plurality of preset rules 132 for system auditing (e.g., Auditd rules). In some embodiments, the operating system 133 of the gateway 130 may capture one or more of the events 131 based on the present rules 132 and generate one or more event logs. The operating system 133 may capture the one or more of the events 131 by determining whether the activity, for each of the one or more events, meets one or more conditions associated with at least one of the one or more preset audit rules 132. The operating system 133 may send the plurality of generated event logs to the syslog server 134. The syslog server 134 may send the generated event logs to the security agent 135. The security agent 135 may send the generated event logs to the cloud server 160 through the encrypted connection 150.

In some embodiments, the cloud server 160 may analyze the plurality of event logs received from the security agent 135 by categorizing the event logs and applying a detection logic to the categorized event logs. The cloud server 160 may detect one or more potential security threats and create one or more alerts based on the analysis. The cloud server 160 may parse the event logs and store the event logs to the database 170. The cloud server 160 may send the one or more alerts created based on the detected one or more potential security threats to the vehicle 110 through the encrypted connection 150.

Figure 2:
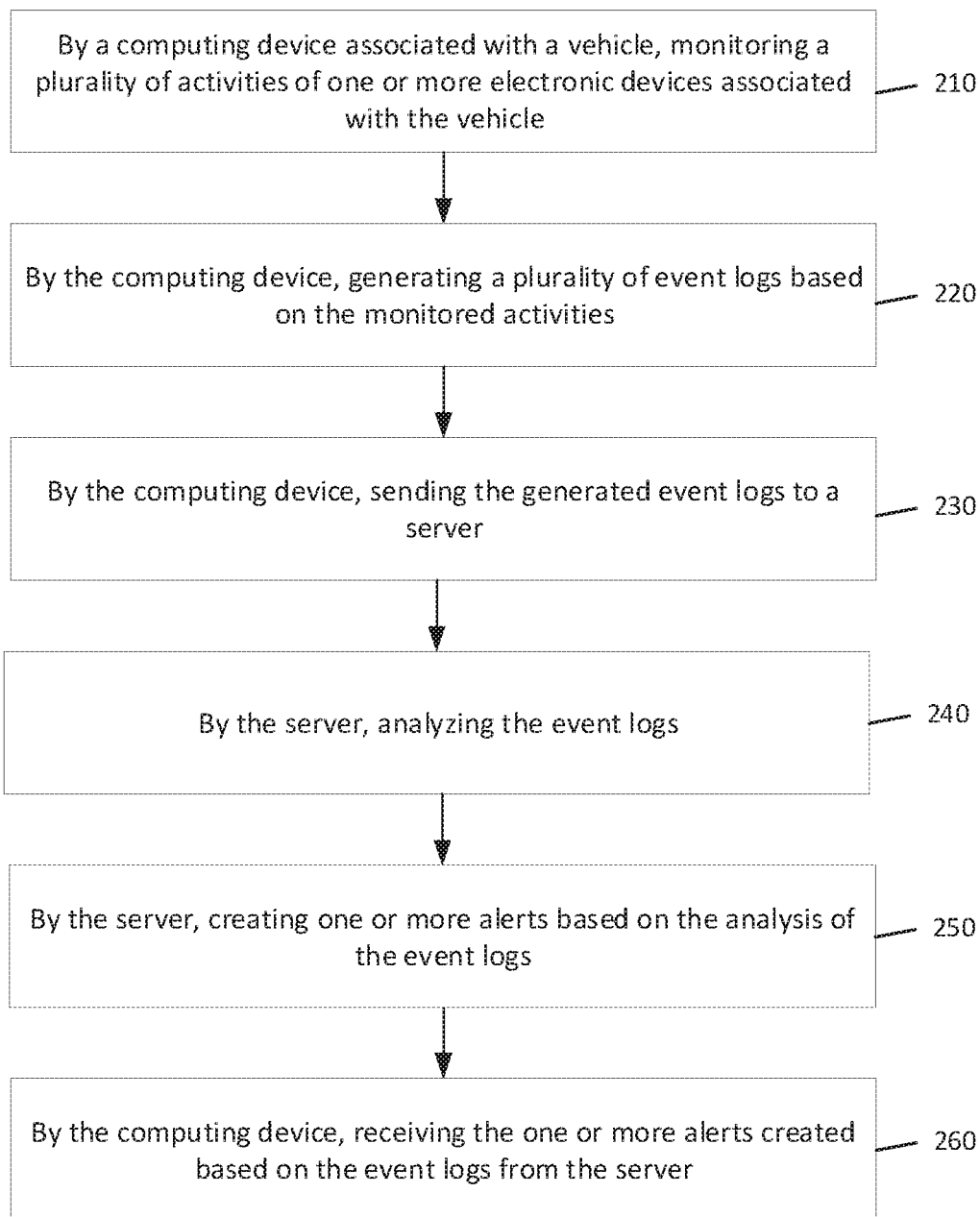
FIG. 2 illustrates an example method for managing security of a vehicle.

FIG. 2 illustrates an example method 200 for managing security of a vehicle 110. The operations of the method 200 presented below are intended to be illustrative. Depending on the implementation, the method 200 may include additional, fewer, or alternative steps performed in various orders or in parallel. The method 200 may start at step 210, where a computing device associated with a vehicle 110 may monitoring a plurality of activities of one or more electronic devices associated with the vehicle 110. The electronic devices associated with the vehicle 110 may comprise one or more ECUs, one or more ADS s 120, one or more security gateways 130, one or more security agents 135, one or more other suitable devices, or any combination thereof. The electronic devices associated with the vehicle 110 may store data or operate software programs that may be subject to security risks and require protection. For example, the information requiring protection may comprise account information associated with the vehicle 110 or its owner, software code executable to control the operation of the vehicle 110, private or proprietary information of an owner of the vehicle 110, other suitable information, or any combination thereof. The computing device associated with the vehicle 110 may monitor various activities that may give rise to security risks such as, for example, code modifications, account activities, access to protected data, command or program execution, other suitable activities, or any combination thereof. The computing device may also monitor failed attempts to carry out activities that may cause security risks. Here, the computing device associated with the vehicle 110 may comprise, for example, a computing device associated with an ADS 120 of the vehicle 110, a computing device associated with a security gateway 130 of the vehicle 110, a computing device otherwise coupled to the vehicle 110, or any combination thereof. The computing device may comprise an operating system (e.g., a Linus operating system) and may comprise one or more audit tools or tools for monitoring activities of electronic devices and capturing events (e.g., Linus Auditd).

At step 220, the computing device associated with the vehicle 110 may generate a plurality of event logs based on the monitored activities. In some embodiments, the computing device may generate the plurality of event logs based on one or more preset rules (e.g., audit rules). Each of the preset rules may be associated with one or more of the electronic devices associated with the vehicle 110. Each rule may specify one or more conditions for recordation of an event log. The one or more audit tools operating on the computing device may capture a plurality of events based on the preset rules. To generate an event log, an audit tool may determine whether the monitored activities meet one or more conditions associated with at least one of the one or more preset rules. The captured events may be saved to a syslog 124 or sent to a remote syslog server 134 for storage.

In some embodiments, each event log may comprise a plurality of data fields including for example, a LogID field, a VehicleID field, a MessageType field, a Timestamp field, an EventID field, a LogType field, a key field, a comm field, an exe field, a pid field, a ppid field, a uid field, an auid field, other suitable fields, or any combination thereof. The LogID field may comprise a unique identifier of the log given by the database 170. The identifier may be automatically incremented. The VehicleID field may comprise an identifier of the vehicle 110. The MessageType field may comprise information indicating the type of the message comprising the event log. For example, for a message comprising an event log, the message type may be "audit." The Timestamp field may comprise a timestamp indicating the time when the event corresponding to the event log occurred. The EventID field may comprise a unique identifier of the event corresponding to the event log. The LogType field may comprise information indicating a type of the event log (e.g., SYSCALL, PATH, CWD). The key field may comprise a name of the preset audit rule that trigger the recordation of the event log. The comm field may comprise a command inputted to an electronic device associated with the vehicle that triggered the event associated with the event log. The exe field may comprise a file system path associated with an executable file that was executed as part of the event. The pid field may comprise a process identifier associated with the event of the event log. The ppid field may comprise an identifier of the parent process of the process associated with the event. The parent process may have created the process associated with the event. The uid field may comprise an identifier of a user who started the process associated with the event. The auid field may comprise an audit user identifier.

At step 230, the computing device associated with the vehicle 110 may send the generated event logs to a server 160. The server 160 may comprise a plurality of computing devices configured to process event logs and detect security threats. The server 160 may communicate with the vehicle 110 and a plurality of other vehicles over network connections 150.

At step 240, the server 160 may analyze the event logs generated by the computing device associated with the vehicle 110. In some embodiments, the server 160 may parse the received event logs and store them in a database 170. The server 160 may examine the event logs and detect whether there are any security threats on the vehicle 110. In some embodiments, the server 160 may categorize the event logs and apply a detection logic to the categorized event logs. Specifically, the server 160 may determine a type of an event log based on the content of the event log (e.g., value in a "key" field, a file path included in the event log). According to the determined type of the event log, the server 160 may select one of a plurality of methods to analyze the event log and detect security threats.

At step 250, the server 160 may create one or more alerts based on the analysis of the event logs. In some situations, the server 160 may detect a security threat based solely on the occurrence of an event of a certain type. In other situations, the server 160 may determine whether an event give rise to a security threat based on a whitelist specifying allowed activities or a blacklist specifying prohibited activities. For example, with respect to an event log, the server 160 may identify a source associated with an activity corresponding to the event log, determine that the source is not among a list of trusted sources stored by the server, and creating an alert associated with the event log based on the determination. As another example, with respect to another event log, the server 160 may identifying a source associated with an activity corresponding to the event log, determining that the source is among a list of prohibited sources stored by the server, and creating an alert associated with the event log based on the determination. Here, the source associated with an activity may comprise a program executed to carry out the activity, a parent executable that triggered the activity, an account associated with the user that initiated the activity, other suitable characteristics associated with the activity, or any combination thereof.

At step 260, the computing device associated with the vehicle 110 may receive, from the server 160, one or more alerts created based on the event logs. In some embodiments, the one or more received alerts may comprise instructions associated with countermeasures for preventing one or more security threats. The computing device associated with the vehicle 110 may implement the countermeasures based on the instructions to prevent the one or more security threats.

In some embodiments, the method 200 illustrated in FIG. 2 may be used to detect various types of security threats. The types of security threats may comprise, for example, unauthorized code modification (e.g., writing attempts to unwritable location, attribute changes), unauthorized account activities (e.g., access to account management files, password access or change, account switching), unauthorized access to protected data (e.g., access to event logs, access to modeling data for autonomous driving, access to encrypted key or certificate files), unauthorized access to protected configurations (e.g., access to kernel parameters, access to audit tool configurations, access to login configurations), unauthorized modifications to security rules (e.g., modification of Iptable rules, modification of audit rules), unauthorized program/command execution (e.g., kernel module operations, loading or booting into another kernel, creating filesystem node, mounting a drive, changing system time), other suitable security threats, or any combination thereof.

In some embodiments, the detectable security threats may comprise modification to executable code in one or more electronic devices associated with the vehicle 110. In some embodiments, during operations of a vehicle 110, components of the vehicle 110 such as the ADS 120 and the security gateway 130 are supposed to be closed systems. Code executed by the components should not be modified unless by an update from an eligible process such as an official software update service (e.g., named "SW Update"). One or more audit rules can be created to monitor if the SW Update is executed, whether SW Update is legitimately executed, if code/program files or directories are modified. Based on the audit rules, the computing device associated with the vehicle 110 may generate one or more event logs and send the event logs to the server 160. An application operating at the server 160 may process the event logs to determine if any process or command other than SW Update changed or attempted to change the code/program files or directories. If so, the server 160 may detect a security threat and generate a corresponding alert.

Figure 3:
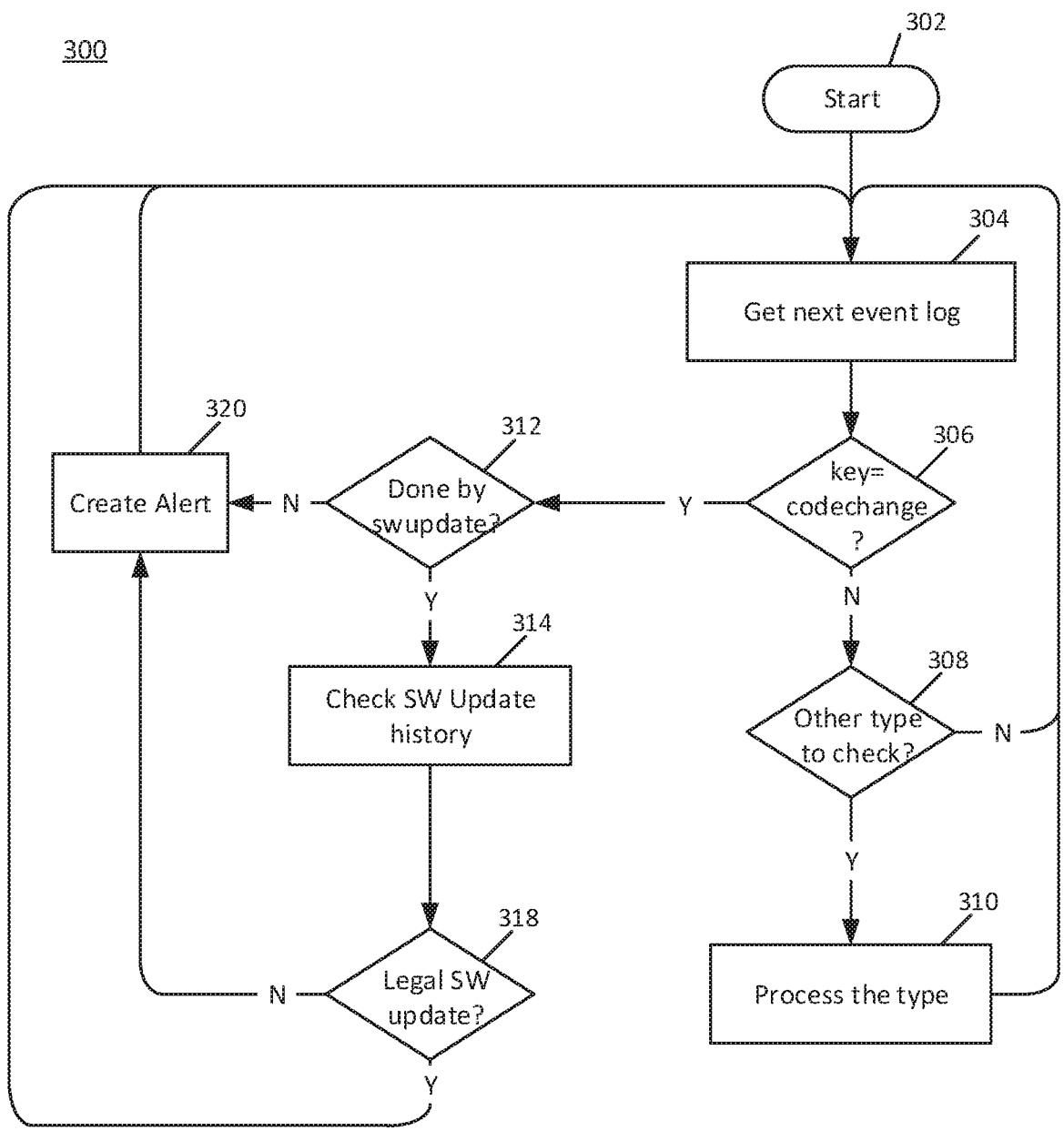
FIG. 3 illustrates an example method for checking a code-modification event for security risks.

FIG. 3 illustrates an example method 300 for checking a code-modification event for security risks. The operations of the method 300 presented below are intended to be illustrative. Depending on the implementation, the method 300 may include additional, fewer, or alternative steps performed in various orders or in parallel. The method 300 may start at step 302. At step 304, an application for detecting security threats that operates at a server 160 may obtain an event log. The event log may have been received from a vehicle 110. A computing device associated with the vehicle 110 may capture at least two types of events: modifications to certain protected program and operation of an authorized software-update process (e.g., named SW Update), which is allowed to modify the protected program. The protected program may be any program operating in an electronic device associated with the vehicle 110 that should not be modified except by an eligible process SW Update. For example, the program may comprise software operating in the security agent 135. An event log, which may comprise multiple lines of log messages, may be generated each time the protected program is modified and each time SW Update is running. Each log message may comprise various data fields including, for example, an identifier, a timestamp, and a key. The identifier may uniquely identify the triggering event for the audit messages. The timestamp may be used to track when the event occurred. The key may identify the audit rule that triggered the recordation of the event log. For example, the key for an audit rule for code protection may be "codechange." The key "codechange" may indicate an event involving change of executable code stored in the vehicle 110.

At step 306, in order to detect security threats involving code modifications, the server 160 may determine whether the event log comprises a key that is "codechange." If the event log does not have such a key, the server 160 may determine whether the event log corresponds to another type of activity to check for security threats at step 308. If so, the server 160 may proceed to check for the corresponding security threats at step 310.

If the event log does have the key "codechange," the server 160 may proceed to step 312 of the method 300 and determine whether the modifications to the code was done by SW Update. The server 160 may search one or more event logs with the key "swupdate," which are event logs created based on the operation of SW Update. If an event log with the key "swupdate" occurred within a certain timeframe of the event log with the key "codechange," the server 160 may determine that the modification to the code was done by SW Update. The respective time points of the events may be determined based on the timestamps included in the event logs. If there is no event log with the key "swupdate" in temporal proximity to the event log with the key "codechange," the server 160 may determine that the modification to the code was done by an unauthorized party. Therefore, if the modification to the code was not done by SW Update, the server 160 may create an alert at step 320. The alert may show that the code was modified illegally. The alert may be sent to the vehicle 110 or to a human administrator for review.

If the modifications to the code done by SW Update, the server 160 may check a software update history at step 314 and determine whether the software update recorded in the event log is legal at step 316. In particular, the server 160 may determine whether the vehicle 110 is supposed to have a software update at the point of time and whether the software update needed to modify the protected program. Such information may be obtained from the SW Update service. If the software update is legal, the server 160 may complete the process without creating a security alert. The server 160 may proceed to check the next event log. If the software update is not legal, the server 160 will proceed to step 320 to create an alert.

In some embodiments, the detectable security threats may comprise unauthorized account activities. In some embodiments, during operations of a vehicle 110, components of the vehicle 110 such as the ADS 120 and the security gateway 130 are supposed to be closed systems. Other than normal operation of one or more preset accounts, there should not be special account activities such as account creation, remote login, account login failure, password change, other special account activities, or any combination thereof. The occurrence of any of the special account activities may warrant creation of an alert. An exception to this mechanism may be when a developer runs a debug mode during debugging.

In some embodiments, an audit tool operating at a computing device associated with the vehicle 110 may capture various account-related activities based on a plurality of preset audit rules. The audit tool may be configured to detect two types of activities: execution of account-related commands and access to account-related files. The captured activities may comprise, for example, modification of a file storing a password, modification of a file storing group identifiers assigned to users, access to a file storing login information, access to a file storing user, group, or password information, modification of a file specifying user privileges (e.g., sudo privileges), execution of a program for configuring login and user accounts, execution of a program for remote login, execution of a program for changing group identifiers, execution of a program for granting user privileges, other suitable activities, or any combination thereof. The audit tool may generate one or more event logs based on detection of account-related activities. Each of the event logs may comprise a key identifying the audit rule that triggered the recordation of the event log. Each of one or more of the event logs may further comprise a field specifying a program or command executed (e.g., a "exe" field). The computing device associated with the vehicle 110 may send the event logs to the server 160 for processing.

In some embodiments, the application for detecting security threats may determine that an event log is related to account activities based on the key in the event log, one or more keywords associated with account activities in the event log, or a file path corresponding to a program or command related to account activities, other suitable information contained in the event log, or any combination thereof. In some embodiments, the application may generate an alert whenever it processes an event log corresponding to account activities. Alternatively, after the application obtains an event log corresponding to account activities, it may check whether one or more exceptions applies and generate an alert if not.

In some embodiments, the detectable security threats may comprise unauthorized data access or modifications. In some embodiments, various files stored in one or more electronic devices associated with the vehicle 110 should not be accessed or modified during normal operation of the vehicle 110. Certain files may allow only certain allowed parties or processes to read or modify. Data requiring protection against unauthorized access or modification may comprise, for example, firewall rules, audit tool configurations, event logs, kernel parameters, system startup scripts, library search paths, user authentication tool (e.g., PAM) configurations, global distribution system (GDS) specific secrets, secure shell (SSH) configurations, system and service manager (e.g., systemd for Linux) data, mandatory access control (MAC) modification data, other suitable data requiring protection, or any combination thereof.

In some embodiments, an audit tool operating at a computing device associated with the vehicle 110 may capture various data access or modification activities based on a plurality of preset audit rules. The audit tool may be configured to detect two types of activities: execution of data access or modification commands and access to files containing protected data. The audit tool may also be configured to detect a party or process that accessed or modified the data. The audit tool may generate one or more event logs based on detection of data access or modification activities. Each of the event logs may comprise a key identifying the audit rule that triggered the recordation of the event log. Each of one or more of the event logs may further comprise a field specifying a program or command executed (e.g., a "exe" field). The computing device associated with the vehicle 110 may send the event logs to the server 160 for processing.

In some embodiments, the application for detecting security threats may determine that an event log is related to data access or modification based on the key in the event log, one or more keywords associated with data access or modification activities in the event log, or a file path corresponding to data requiring protection, other suitable information contained in the event log, or any combination thereof. In some embodiments, the application may generate an alert whenever it processes an event log corresponding to data access or modification activities. Alternatively, after the application obtains an event log corresponding to data access or modification activities, it may check whether one or more exceptions applies and generate an alert if not. For example, the application may check if an authorized process made the modification to certain data and whether the modification made by the authorized process was legal in a manner similar to that illustrated in FIG. 3. If the modifications were made by an authorized process legally, the application may refrain from generating an alert. Otherwise, the application may generate an alert.

In some embodiments, the data requiring protection may be stored in encrypted form. The data may be decrypted by one or more programs or scripts using a unique cryptographic key. Use of the programs or scripts may require login of a user. In some embodiments, the audit tool may be configured to capture activities of the programs and scripts used to decrypt the protected data and record in event logs the account login used to access the programs or scripts. The computing device associated with the vehicle 110 may send to the server 160 event logs recording each time the programs or scripts are used to decrypt a protected file and each modification to the programs or scripts. If some embodiments, the server 160 may create an alert each time the programs or scripts are changed, each time a protected file is accessed by a process other than the legitimate programs or scripts, and each time a protected file is accessed by an unauthorized user using the programs or scripts.

In some embodiments, the detectable security threats may comprise unauthorized command or program execution (e.g., uninstalling/installing a program, enabling a network interface for unauthorized access). In some embodiments, some commands or programs in one or more electronic devices associated with the vehicle 110 should not be allowed to run during normal operations of the vehicle 110. For example, once the vehicle 110 starts and loaded required kernel modules, the kernel module loading or unloading commands should not be called anymore until the vehicle shuts down. The audit tool may be configured to capture an event when an attacker tries to unload a legitimate kernel module and load a hacking kernel module. As another example, once the audit tool starts to operate, the preset audit rules shall not be modified. The audit tool may be configured to capture attempts to change audit rules. Execution of programs or commands requiring monitoring may comprise, for example, kernel module loading and unloading, operation of audit management tools, kernel switching operations (e.g., KExec system call for Linux), file/directory creation operations (e.g., Mount operation), setting clock, changes to network environment configurations, critical elements access failures, switching accounts operations, power state modifications, discretionary access control (DAC) modifications, use of an address length (e.g., 32 bit) inconsistent with the system's default address length (e.g., 64 bit), code injection, operation of software management tools, other suitable execution of programs or commands, or any combination thereof.

In some embodiments, an audit tool operating at a computing device associated with the vehicle 110 may capture various program/command execution activities based on a plurality of preset audit rules. The audit tool may generate one or more event logs based on detection of program/command execution activities. Each of the event logs may comprise a key identifying the audit rule that triggered the recordation of the event log. Each of one or more of the event logs may further comprise a field specifying a program or command executed (e.g., a "exe" field). The computing device associated with the vehicle 110 may send the event logs to the server 160 for processing.

In some embodiments, the application for detecting security threats may determine that an event log is related to suspicious program/command execution based on the key in the event log, one or more keywords associated with program/command execution activities in the event log, or a file path corresponding to a monitored program or command, other suitable information contained in the event log, or any combination thereof. In some embodiments, the application may generate an alert whenever it processes an event log corresponding to program/command execution activities. Alternatively, after the application obtains an event log corresponding to program/command execution activities, it may check whether one or more exceptions applies and generate an alert if not. For example, if execution of a program deviates from a normal routine of execution for a plurality of programs, the application for detecting security threats may generate an alert. Otherwise, it may refrain from generating an alert. Although the above examples describe detection of security threats by a server-side computing system (e.g., the server 160), one or more of the steps of the methods or processes illustrated by the examples may be performed by one or more computing devices associated with the vehicle 110 or one or more other suitable computing devices.

As illustrated by the examples above, security threats to various software and data assets associated with a vehicle that require protection (e.g., code, data, account information) may be caused by several types of activities (e.g., file modification, file execution). The application for detecting security threats may be configured to determine a type or category of activities associated with each event log. The application for detecting security threats may be configured to process each type of activities as recorded in event logs. For each type of activities, the application may follow a consistent routine or execute certain detection logic that is applicable to the entire type of activities. The routine or detection logic may comprise references to data files comprising detection rules for each individual security threat that may be caused by the type of activities. To address a new security threat that is caused by one or more of the existing detectable activities, the application for detecting security threats may execute an existing detection logic but refer to an updated data file specifying criteria for detecting the new security threat.

In some embodiments, after obtaining an event log, the server 160 may determine a type of activities associated with the event log. Based on the determination of the type of activities, the server may determine appropriate detection logic to apply to the event log to detect security threats. Such activities may comprise, for example, unauthorized file modification, unauthorized commends/programs execution, unauthorized file transfer, other suitable activities, or any combination thereof. Unauthorized file modification may refer to an event in which a file stored in a storage device associated with the vehicle 110 is modified by an unauthorized party. Files may be categorized into two subcategories: no modification by anybody (e.g., key="nomodify") and no modification by anybody other than certain processes (e.g., processes on a white list) (e.g., key="wlmodify"). The content and attributes of files of the former subcategory should not be modified by any process during runtime of the audit tool. The content or attributes of files of the latter subcategory can only be modified by eligible processes. Unauthorized execution may refer to an event in which a file, program, or command is executed by an unauthorized party. Files, programs, or commands may be categorized into two subcategories: no execution by anybody (e.g., key="noexe") and no execution by anybody other than certain processes (e.g., key="wlexe"). Files, programs, or commands of the former subcategory should not be executed by anybody during runtime of the audit tool. Files, programs, or commands of the latter subcategory can only be executed by eligible processes. Unauthorized file transfer may refer to an event in which a file stored in a storage device associated with the vehicle 110 is transferred by an unauthorized party. A transfer of a file may be detected when a particular program or commands reads the file. Files may be categorized into two subcategories: no transfer by anybody (e.g., key="notransfer") and no transfer by anybody other than certain processes (e.g., key="wlmodify"). Files of the former subcategory should not be transferred by anybody during the runtime of the audit tool. As an example, it may be the case that logs files should not be read or transferred during the operation of the vehicle 110. They can only be read when developers remove the vehicle 110 from regular operation and turn on debug or diagnostic mode. Files of the latter subcategory can only be transferred by eligible processes.

Figure 4:
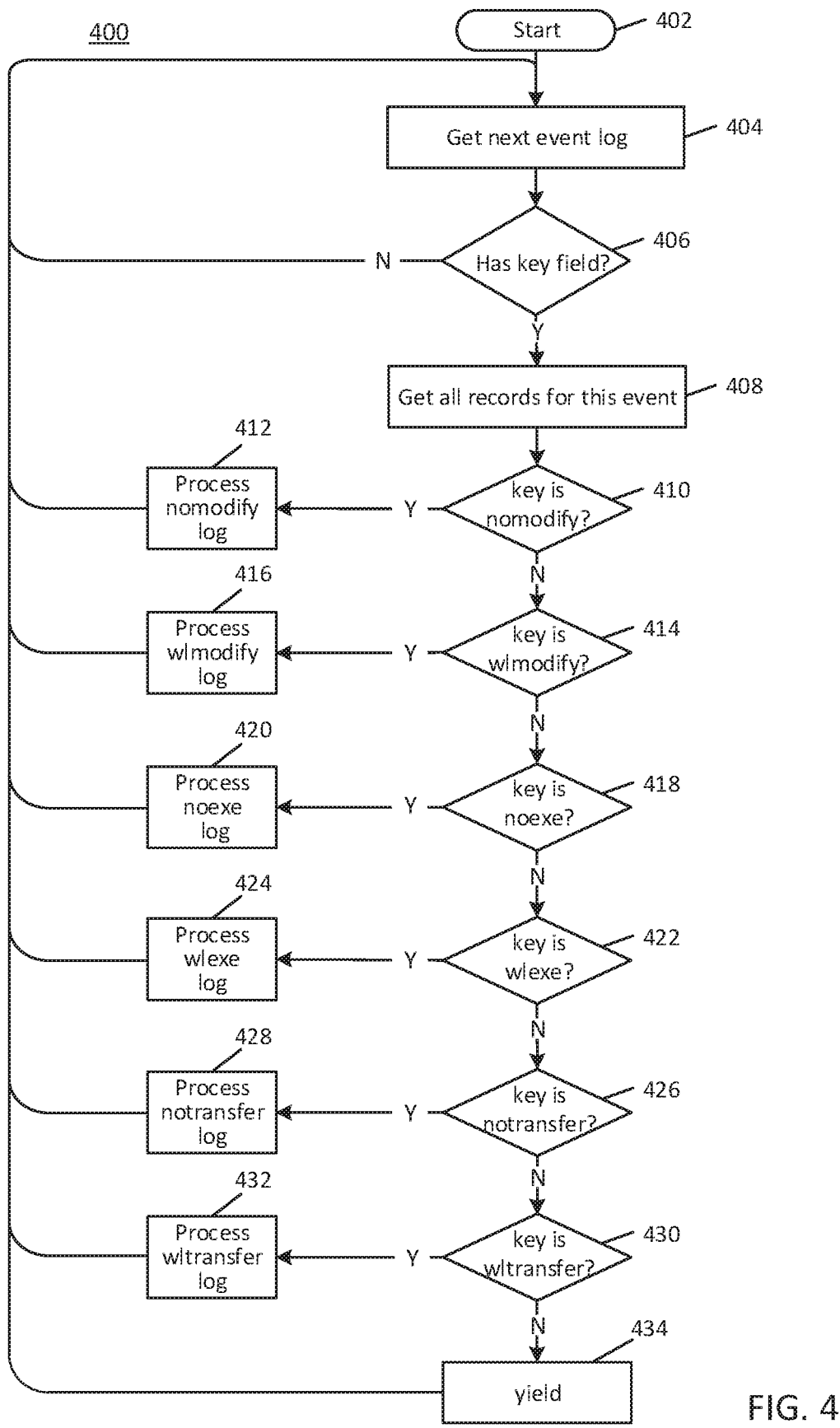
FIG. 4 illustrates an example method for determining a type of activity associated with an event log.

FIG. 4 illustrates an example method 400 for determining a type of activity associated with an event log. The operations of the method 400 presented below are intended to be illustrative. Depending on the implementation, the method 400 may include additional, fewer, or alternative steps performed in various orders or in parallel. The method 400 may start at step 402. At step 404, the server 160 may obtain an event log. The event log may have been received from a computing device associated with the vehicle 110, parsed, stored in a database 170 associated with the server 160. After obtaining the event log, the server 160 may use an application for processing the event log. At step 406, the server 160 may check the event log to determine whether the event log has a key field. The key field may comprise a name of a rule that triggered generation of the event log. If not, the server 160 may terminate processing the event log and proceed to process the next event log. If the event log does have a key field, the server 160 may proceed to step 408. At step 408, the server 160 may obtain all records associated with the event corresponding to the event log. Specifically, the server 160 may obtain a vehicle identifier and an event identifier from the event log. It may query the database 170 storing a plurality of event logs using the vehicle identifier and the event identifier and obtain all the event logs with the vehicle identifier and event identifier. The server 160 may obtain one or more other event logs corresponding to the same event. Then, the server 160 may proceed to determine whether the event corresponds to a type that may create a security threat detectable by the server 160.

At step 410, the server 160 may determine whether the key of the event log is "nomodify," which may correspond to modification of a file that shall not be modified during runtime of the audit tool. If so, the server 160 may proceed to step 412, in which it may process the event log using a detection logic configured to process event logs of the type "nomodify" to determine whether to create an alert. Otherwise, the server 160 may proceed to step 414. At step 414, the server 160 may determine whether the key of the event log is "wlmodify," which may correspond to modification of a file that shall not be modified except by eligible processes. If so, the server 160 may proceed to step 416, in which it may process the event log using a detection logic configured to process event logs of the type "wlmodify" to determine whether to create an alert. Otherwise, the server 160 may proceed to step 418.

At step 418, the server 160 may determine whether the key of the event log is "noexe," which may correspond to execution of a file, program, or command that should not be executed during runtime of the audit tool. If so, the server 160 may proceed to step 420, in which it may process the event log using a detection logic configured to process event logs of the type "noexe" to determine whether to create an alert. Otherwise, the server 160 may proceed to step 422. At step 422, the server 160 may determine whether the key of the event log is "wlexe," which may correspond to execution of a file, program, or command that should not be executed except by eligible processes. If so, the server 160 may proceed to step 424, in which it may process the event log using a detection logic configured to process event logs of the type "wlexe" to determine whether to create an alert. Otherwise, the server 160 may proceed to step 426.

At step 426, the server 160 may determine whether the key of the event log is "notransfer," which may correspond to access or transfer of a file that should not be read or transferred during runtime of the audit tool. If so, the server 160 may proceed to step 428, in which it may process the event log using a detection logic configured to process event logs of the type "notransfer" to determine whether to create an alert. Otherwise, the server 160 may proceed to step 430. At step 430, the server 160 may determine whether the key of the event log is "wltransfer," which may correspond to access or transfer of a file that should not be read or transferred except by eligible processes. If so, the server 160 may proceed to step 432, in which it may process the event log using a detection logic configured to process event logs of the type "wltransfer" to determine whether to create an alert. Otherwise, the server 160 may proceed to step 434.

At step 434, the server 160 may have determined that the rule name or key associated with the event log belongs to none of one or more predefined categories. Then, the server 160 may terminate processing this event log and proceed to the next event log. Although FIG. 4 illustrates processing an event log by a server-side computing system (e.g., the server 160), one or more of the steps of the methods or processes illustrated by FIG. 4 may be performed by one or more computing devices associated with the vehicle 110 or one or more other suitable computing devices.

Figure 5:
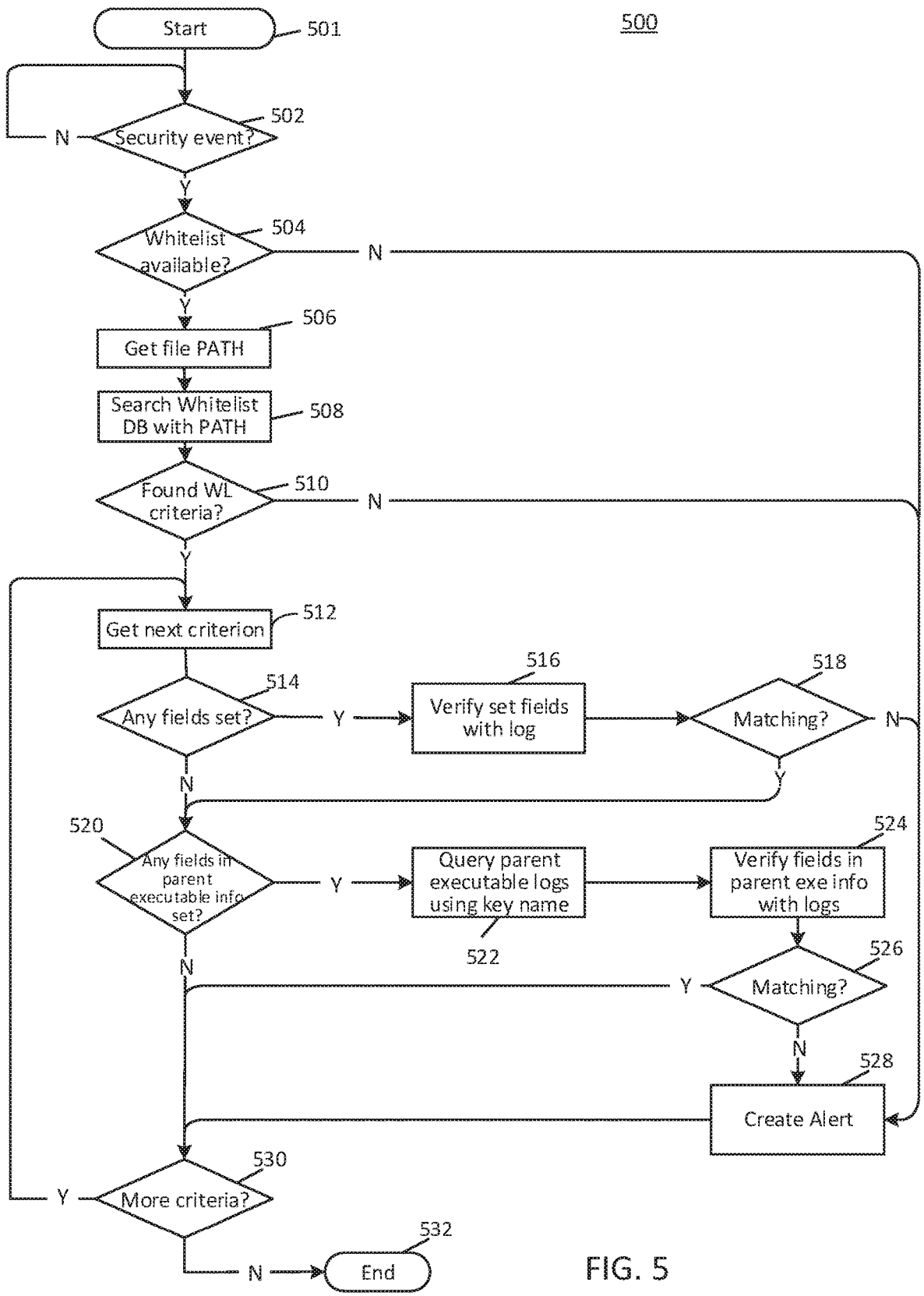
FIG. 5 illustrates an example method for detecting security risks.

FIG. 5 illustrates an example method 500 for detecting security risks. In some embodiments, after the server 160 has determined a detection logic for processing one or more event logs associated with an event based on the type of the event (illustrated in FIG. 4), the server 160 may carry out the steps of the method 500 based on the determined detection logic in order to determine whether to create an alert in response to the event. To process the one or more event logs, the server 160 may further refer to detection rules that specify criteria for detecting specific security risks. The detection rules may be in the form of, for example, a whitelist or a blacklist. The operations of the method 500 presented below are intended to be illustrative. Depending on the implementation, the method 500 may include additional, fewer, or alternative steps performed in various orders or in parallel. The method may start at step 501. At step 502, the server 160 may determine whether the one or more event logs correspond to a security event, which may involve activities that are generally prohibited. For example, the security event may comprise modification of a file that generally should not be modified, execution of a program that generally should not be executed, transfer of a file that generally should not be transferred, or another event that generally may cause a security threat. If the server 160 determines that the one or more event logs are not associated with a security event, the server 160 may proceed to process a next event log. If the server 160 determines that the one or more event logs are associated with a security event, it may proceed to step 504 of the method 500, where it may determine whether a whitelist is available to provide exceptions to certain situations associated with the event. In some embodiments, the server 160 may determine whether a whitelist is available based on a key in the one or more event logs. For example, if the key is "nomodify," "noexe," or "notransfer," the server 160 may determine that no whitelist is available; if the key is "wlmodify," "wlexe," or "wltransfer," the server 160 may determine that a whitelist is available. If the server 160 determines that no whitelist is available, it may proceed to step 528 to create an alert because the event associated with the one or more event logs should never be triggered during normal operation of the vehicle 110. If the server 160 determines that a whitelist is available, it may proceed to step 506 and check if the event was triggered by a whitelisted process.

At step 506, the server 160 may obtain, from the one or more event logs, a file path corresponding to a protected asset. For example, the file path may correspond to a protected file that was modified, transferred, or executed. At step 508, the server 160 may search a whitelist database based on the obtained file path. The whitelist database may be implemented on the database 170. The whitelist may have previously been created to store information associated with scenarios where otherwise prohibited activities are allowable. The whitelist may comprise various information for each listed event. The information may comprise a file path associated with a protected asset (e.g., files, programs, commands). This file path may also appear in audit rules and event logs associated with the protected asset. The information may also comprise one or more criteria for each of one or more whitelisted scenarios, in which the occurrence of the event does not give rise to a security threat. The information may comprise a list of eligible commands, executables, user identifiers, processes, or other suitable characteristics of an activity that can legally trigger the event. For example, in the situation of a file modification event, the whitelist may list an executable program that is allowed to modify a file that otherwise should not be modified. The information may further comprise information about a parent executable that may legally trigger the event, including, for example, a key name for event log for a parent process, a file name or path for the parent executable, commands for the parent executable, a user identifier for the parent executable, or other suitable information thereof. For each security event, the server 160 may be configured to go through all whitelisted scenarios to determine whether an alert should be created.

At step 510, the server 160 may determine whether its search of the whitelist database has returned any criteria for a whitelisted scenario. If not, the server 160 may directly proceed to step 528 and create an alert. Otherwise, the server 160 may proceed to step 512 to obtain a criterion for one or more whitelisted scenarios in the whitelist database. At step 514, the server 160 may determine whether the criterion set a requirement for any field of the event log corresponding to the security event. If there is no such requirement, the server 160 may proceed to step 520 and determine if the criterion sets a requirement for any field in information associated with a parent executable. If the criterion does set a requirement for a field in the event log, the server 160 may verify the set requirement with the event log at step 516 and determine whether the value in the corresponding field matches the required value at step 518. If the values match, the server 160 may proceed to step 520. Otherwise, it may directly proceed to step 528 to generate an alert.

At step 520, the server 160 may determine if the criterion sets a requirement for any field in information associated with a parent executable. The criterion may specify a required key for the parent executable. At step 522, the server 160 may query a database storing event logs for ones associated with the parent executable based on the required key and the pid or ppid specified by the event log corresponding to the security event. Then, the server 160 may verify the set requirement with the event log associated with the parent executable at step 524 and determine whether the value in the corresponding field matches the required value at step 526. If the values match, the server 160 may proceed to step 530. Otherwise, it may directly proceed to step 528 to generate an alert. At step 530, the server 160 may determine whether there are any more criteria for the whitelisted scenario. If so, the server 160 may repeat the steps required for checking satisfaction of the next criterion until exhausting all criteria. Otherwise, the server 160 may determine that all criteria for the whitelisted scenario are met and end the process at step 532 without generating an alert.

As an example and not by way of limitation, it may be desirable to protect a target program (e.g., a program associated with the security agent 135) from modification. The target program may only be legally modified by a parent executable (e.g., SW Update). To manage security of this scenario, one or more rules may be set for the audit tool running at one or more computing devices associated with the vehicle 110. The one or more rules may comprise a first rule "wlmodify" tracking each instance a change is made to the target program and a second rule "swupdate" to track each time the parent executable is executed. The server 160 may receive from one or more computing devices associated with the vehicle 110 an event log having a key "wlmodify" and a file path associated with the target program.

Based on this event log, the server 160 may determine that a whitelisted scenario is available for this otherwise prohibited event of modifying the target program. The server 160 may search a whitelist database using the file path in the event log and obtain one or more criteria for the whitelisted scenario. The entry in the whitelist corresponding to the file path may, for example, have an entry as shown below:

comm="cp" exe="Thin/cp"
auid=1000 uid=1000 gid=1000
cwd="/home/[target program]"
Parent executable information:
key="swupdate"
comm="bash" exe="Thin/bash"
auid=1000 uid=1000 gid=1000
in type=PATH log, name="/home/[parent executable]"
cwd="/home/[target program]"

The server 160 may identify an event log corresponding to the parent executable based on the key and file path specified in the entry. Then, the server 160 may compare the requirements in this whitelist entry with one or more corresponding fields in the event log corresponding to the target program and the parent executable. If each of the field matches with its corresponding requirement, the server 160 may determine that the modification of the target program is allowed. Otherwise, it may create an alert. Although FIG. 5 illustrates steps for detecting security risks performed by a server-side computing system (e.g., the server 160), one or more of the steps of the methods or processes illustrated by FIG. 5 may be performed by one or more computing devices associated with the vehicle 110 or one or more other suitable computing devices.

In some embodiments, an event may only create a security threat in certain scenarios, while all other scenarios are eligible. To address such an event, a blacklist may be created specifying one or more criteria for a blacklisted scenario. In response to receiving an event log corresponding to an event having one or more blacklist entries, the server 160 may determine whether the event log or an event log corresponding to a parent executable satisfies each of one or more criteria for a blacklisted scenario corresponding to the event. If so, the server 160 may generate an alert. Otherwise, the server 160 may determine that the event does not create a security threat.

In some embodiments, an alert generated by the server 160 may be provided to an investigator for review. The investigator may determine whether the event corresponding to the alert actually creates a security threat. If so, the investigator may take one or more measures to address the security threat. For example, the investigator may push instructions to the computing device associated with the vehicle 110 to reset an operating system associated with the vehicle, to install a software update to fix a system bug, to force shutting down the vehicle, etc. As another example, the investigator may dispatch one or more field engineers to the location of the vehicle 110 to fix any security issues. The alert may also be provided to one or more software services for further processing. The one or more software services may automatically determine one or more measures to address the security threat and send instructions associated with the one or more measures to the vehicle 110 to implement. The one or more software services may also determine that escalation is required for a security threat and forward the alert to an investigator. In some embodiments, the investigator or the software service may determine an event corresponding to an alert is actually associated with an eligible scenario. In this case, an entry corresponding to the eligible scenario maybe added to a whitelist stored in the whitelist database.

Figure 6:
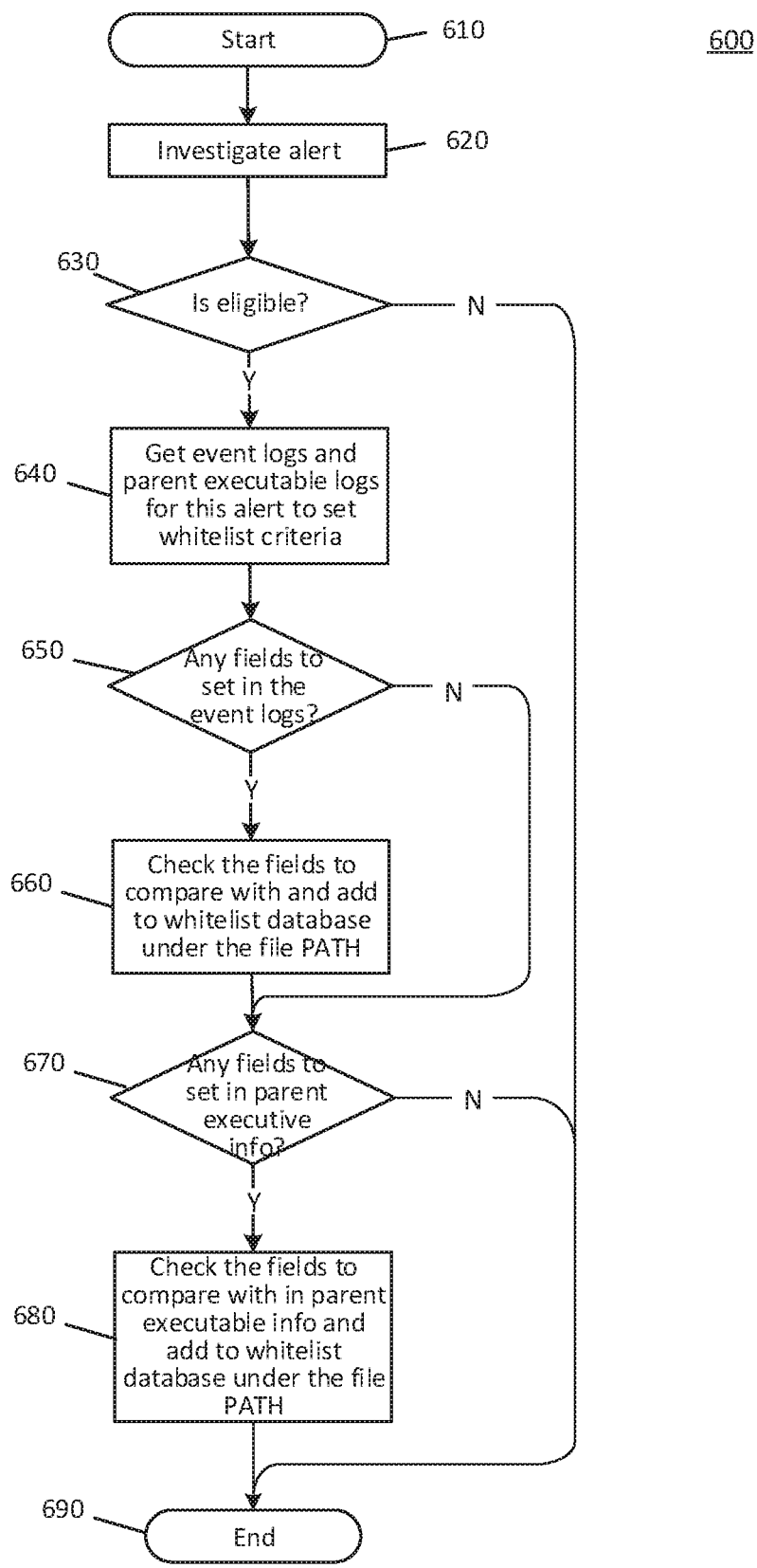
FIG. 6 illustrates an example method for updating a whitelist for security management.

FIG. 6 illustrates an example method for updating a whitelist for security management. The operations of the method 600 presented below are intended to be illustrative. Depending on the implementation, the method 600 may include additional, fewer, or alternative steps performed in various orders or in parallel. The method 600 may start at step 610. At step 620, an investigator or a software service may investigate an alert created by the server 160. At step 630, the investigator or software service may determine whether the scenario corresponding to the alert is eligible for adding to a whitelist. If not, the method 600 may be terminated at step 690. Otherwise, the method 600 may proceed to step 640. At step 640, upon receiving an input from the investigator or the software service indicating that the scenario is eligible for adding to the whitelist, the server 160 may obtain event logs and/or parent executable logs for the alert. One or more whitelist criteria may be set based on the entries in the event logs and/or parent executable logs.

At step 650, the investigator or software service may determine if there are any fields in the event logs to set in the whitelist criteria. If not, the method 600 may proceed to step 670. If there are fields that need to be set, the investigator or software service may provide one or more inputs to the server 160 indicating the fields to set. At step 660, in response to the inputs, the server 160 may populate the values of the fields in the event logs as requirements for the whitelisted scenario. Alternatively, the investigator or software service may provide inputs as to allowable ranges of values for the corresponding fields. The server 160 may populate the ranges as requirements for the whitelisted scenario. The requirements or criteria for the whitelisted scenario may be stored in the whitelist database in correspondence to a file path associated with the event log that triggered the alert. Then, the method 660 may proceed to step 670. At step 670, the investigator or software service may determine if there are any fields in the parent executable logs to set in the whitelist criteria. If not, the method 600 may proceed to step 690 and complete the process. If there are fields that need to be set, the investigator or software service may provide one or more inputs to the server 160 indicating the fields to set. At step 680, in response to the inputs, the server 160 may populate the values of the fields in the parent executable logs as requirements for the whitelisted scenario. Alternatively, the investigator or software service may provide inputs as to allowable ranges of values for the corresponding fields. The server 160 may populate the ranges as requirements for the whitelisted scenario. The requirements or criteria for the whitelisted scenario may be stored in the whitelist database in correspondence to a file path associated with the event log that triggered the alert. The method 600 may end at step 690.

In some embodiments, a blacklist is used to create an alert. In case the alert is determined to correspond to an eligible scenario, the server 160 may be configured to remove or modify one or more entries in the blacklist in response to the determination. The removal or modification of the one or more entries in the blacklist may similarly be based on the event log and parent executable log corresponding to the event associated with the alert.

In some embodiments, the whitelist or blacklist database may be updated based on inputs from a software service as described above. The software service may update the whitelist or blacklist data based on one or more machine-learning models. The one or more machine-learning models may be configured to accept one or more event logs as inputs and generate outputs as to whether alerts should be created. In some embodiments, the one or more machine-learning models may be trained based on various data inputs. The data inputs may comprise, for example, event logs associated with a plurality of events. The event logs may be tagged based on whether their corresponding events are determined to be eligible or to be security threats. The one or more machine-learning models may further be trained based on new events and data indicating final determinations as to whether they are security threats. The training data for the one or more machine-learning models may be generated by human investigators or be automatically generated by one or more software programs. The one or more machine-learning models may also generate one or more determinations as to whether the whitelist database or the blacklist database needs to be updated and provide one or more inputs to update the whitelist or blacklist.

Figure 7:
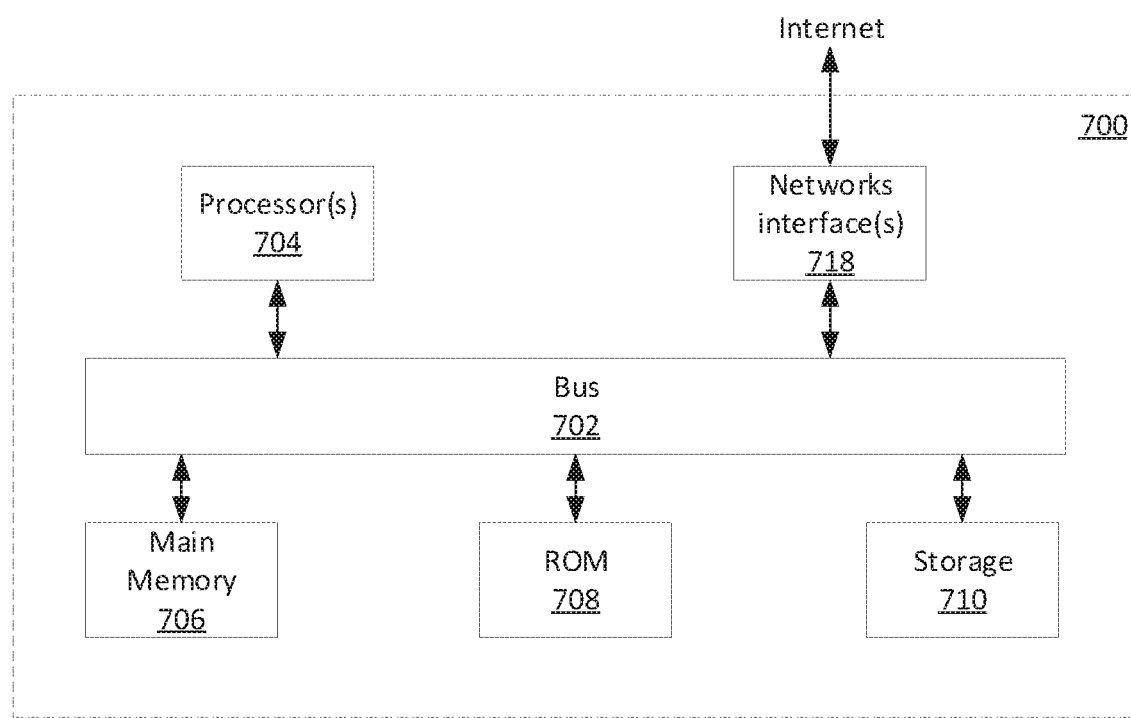
FIG. 7 illustrates a block diagram of a computer system in which any of the embodiments described herein may be implemented.

FIG. 7 is a block diagram of a computer system in which any of the embodiments described herein may be implemented. The system 700 may correspond to one or more electronic devices associated with the network environment 100 as illustrated by FIG. 1, such as the ADS 120, the gateway 130, the security agent 135, the cloud server 160, or the database 170. The system 700 may also correspond to one or more computing devices associated with the vehicle 110 for monitoring activities and generating event logs or one or more computing devices associated with the server 160 for processing event logs and generating alerts. The computer system 700 includes a bus 702 or other communication mechanism for communicating information, one or more hardware processor 704 coupled with the bus 702 for processing information. The hardware processor 704 may be, for example, one or more general purpose microprocessors. The hardware processor 704 may correspond to the processor 704 described above.

The computer system 700 also includes a main memory 706, such as a random-access memory (RAM), cache and/or other dynamic storage devices, coupled to bus 702 for storing information and instructions to be executed by the processor 704. The main memory 706 also may be used for storing temporary variables or other intermediate information during execution of instructions to be executed by the processor 704. Such instructions, when stored in storage media accessible to the processor 704, render the computer system 700 into a special-purpose machine that is customized to perform the operations specified in the instructions. The computer system 700 further includes a read only memory (ROM) 708 or other static storage device coupled to the bus 702 for storing static information and instructions for the processor 704. A storage device 710, such as a magnetic disk, optical disk, or USB thumb drive (Flash drive), etc., is provided and coupled to bus 702 for storing information and instructions. The main memory 706, the ROM 708, and/or the storage device 710 may correspond to the main memory 706 described above.

The computer system 700 may implement the techniques described herein using customized hard-wired logic, one or more ASICs or FPGAs, firmware and/or program logic which in combination with the computer system causes or programs the computer system 700 to be a special-purpose machine. According to one embodiment, the techniques herein are performed by the computer system 700 in response to the processor 704 executing one or more sequences of one or more instructions contained in the main memory 706. Such instructions may be read into the main memory 706 from another storage medium, such as the storage device 710. Execution of the sequences of instructions contained in the main memory 706 causes the processor 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion. Such non-transitory media may comprise non-volatile media and/or volatile media. Non-volatile media includes, for example, optical or magnetic disks, such as the storage device 710. Volatile media includes dynamic memory, such as the main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes one or more communication interface 718 coupled to the bus 702. The communication interface 718 provides a two-way data communication coupling to one or more network links that are connected to one or more local networks. For example, the communication interface 718 may be an integrated services digital network (ISDN) card, cable modem, satellite modem, or a modem to provide a data communication connection to a corresponding type of telephone line. As another example, the communication interface 718 may be a local area network (LAN) card to provide a data communication connection to a compatible LAN (or WAN component to communicated with a WAN). Wireless links may also be implemented. In any such implementation, the communication interface 718 sends and receives electrical, electromagnetic or optical signals that carry digital data streams representing various types of information.

The computer system 700 can send messages and receive data, including program code, through the network(s), network link and the communication interface 718. In the Internet example, a server might transmit a requested code for an application program through the Internet, the ISP, the local network and the communication interface 718.

The received code may be executed by the processor 704 as it is received, and/or stored in the storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for managing security of a vehicle, comprising:
   monitoring a plurality of activities of one or more electronic devices associated with the vehicle;
   generating a plurality of event logs based on the monitored activities, wherein each of the plurality of event logs comprises a key field specifying a rule triggering a recordation of the event log;
   sending the generated event logs to a server associated with the vehicle for analyzing, wherein the analyzing comprises:
      detecting that a first event log comprises a first key value in the key field;
      searching for a second event log comprising a second key value associated with the first key value;
      in response to finding the second event log, determining that an activity corresponding to the first event log is legitimate; and
      in response to not finding the second event log, generating an alert; and
   receiving, from the server, one or more alerts created based on the generated event logs.

2. The method of claim 1, wherein the electronic devices comprise:
   one or more electronic control units (ECUs);
   one or more autonomous driving systems (ADSs);
   one or more security gateways; or
   one or more security agents.

3. The method of claim 1, wherein the generating the plurality of event logs comprises:
   generating the plurality of event logs based on one or more preset rules, wherein each of the one or more preset rules is associated with one or more of the electronic devices.

4. The method of claim 1, wherein the monitored activities comprise:
   code modifications;
   account activities;
   access to protected data; or
   command or program execution.

5. The method of claim 1, wherein the generating the plurality of event logs comprises:
   determining, for each of one or more of the monitored activities, whether the activity meets one or more conditions associated with at least one of one or more preset rules.

6. The method of claim 1, the analyzing further comprising:

categorizing the generated event logs and applying a detection logic to the categorized event logs.

7. The method of claim 1, wherein the analyzing further comprises, for each of one or more of the generated event logs:
identifying a source associated with an activity corresponding to the event log;
determining that the source is not among a list of trusted sources stored by the server; and
creating an alert associated with the event log based on the determination.

8. The method of claim 1, wherein the analyzing further comprises, for each of one or more of the generated event logs:
identifying a source associated with an activity corresponding to the event log;
determining that the source is among a list of prohibited sources stored by the server; and
creating an alert associated with the event log based on the determination.

9. The method of claim 1, further comprising, after the sending the generated event logs to the server:
storing, by the server, the event logs into a database.

10. The method of claim 1, wherein the one or more received alerts comprise instructions associated with countermeasures for preventing one or more security threats.

11. The method of claim 10, further comprising, after the receiving one or more alerts created based on the generated event logs:
implementing the countermeasures based on the instructions to prevent the one or more security threats.

12. A system for managing security of a vehicle, comprising a client associated with the vehicle and a server, wherein the client and the server comprise one or more processors and one or more non-transitory computer-readable memories coupled to the one or more processors and configured with instructions executable by the one or more processors to cause the system to perform operations comprising:
monitoring, by the client, a plurality of activities of one or more electronic devices associated with the vehicle;
generating, by the client, a plurality of event logs based on the monitored activities, wherein each of the plurality of event logs comprises a key field specifying a rule triggering a recordation of the event log;
sending, by the client to the server, the generated event logs for analyzing, wherein the analyzing comprises:
detecting a first event log comprising a first key value in the key field;
searching for a second event log comprising a second key value associated with the first key value;
in response to finding the second event log, determining that an activity corresponding to the one event log is legitimate; and
in response to not finding the second event log, generating an alert; and
receiving, by the client from the server, one or more alerts created based on the generated event logs.

13. The system of claim 12, wherein the monitored activities comprise:
code modifications;
account activities;
access to protected data; or
command or program execution.

14. The system of claim 12, wherein the generating the plurality of event logs comprises:
determining, for each of one or more of the monitored activities, whether the activity meets one or more conditions associated with at least one of one or more preset rules.

15. The system of claim 12, wherein the analyzing further comprises:
categorizing the generated event logs and applying a detection logic to the categorized event logs.

16. The system of claim 12, wherein the analyzing further comprises, for each of one or more of the generated event logs:
identifying a source associated with an activity corresponding to the event log;
determining that the source is not among a list of trusted sources stored by the server; and
creating an alert associated with the event log based on the determination.

17. The system of claim 12, wherein the analyzing further comprises, for each of one or more of the generated event logs:
identifying a source associated with an activity corresponding to the event log;
determining that the source is among a list of prohibited sources stored by the server; and
creating an alert associated with the event log based on the determination.

18. The system of claim 12, wherein the one or more alerts comprise instructions associated with countermeasures for preventing one or more security threats.

19. The system of claim 18, wherein the operations further comprise, after the receiving one or more alerts created based on the generated event logs:
implementing, by the client, the countermeasures based on the instructions to prevent the one or more security threats.

20. A non-transitory computer-readable storage medium for managing security of a vehicle, configured with instructions executable by one or more processors to cause the one or more processors to perform operations comprising:
monitoring a plurality of activities of one or more electronic devices associated with the vehicle;
generating a plurality of event logs based on the monitored activities, wherein each of the plurality of event logs comprises a key field specifying a rule triggering a recordation of the event log;
sending the generated event logs to a server for analyzing, wherein the analyzing comprises:
detecting a first event log comprising a first key value in the key field;
searching for a second event log comprising a second key value associated with the first key value;
in response to finding the second event log, determining that an activity corresponding to the one event log is legitimate; and
in response to not finding the second event log, generating an alert; and
receiving, from the server, one or more alerts created based on the generated event logs.

* * * * *